(12) United States Patent
Boivin et al.

(10) Patent No.: US 8,675,275 B2
(45) Date of Patent: Mar. 18, 2014

(54) RARE-EARTH-DOPED OPTICAL FIBER HAVING SMALL NUMERICAL APERTURE

(75) Inventors: David Boivin, Longjumeau (FR); Alain Pastouret, Massy (FR); Ekaterina Burov, Boulogne-Billancourt (FR); Cedric Gonnet, Paris (FR)

(73) Assignee: Draka Comteq, B.V., Amsterdam (NL)

( * ) Notice: Subject to any disclaimer, the term of this patent is extended or adjusted under 35 U.S.C. 154(b) by 467 days.

(21) Appl. No.: 12/944,422

(22) Filed: Nov. 11, 2010

(65) Prior Publication Data

US 2011/0116160 A1    May 19, 2011

(30) Foreign Application Priority Data

Nov. 13, 2009 (FR) .................................. 09 58010

(51) Int. Cl.
*H04B 10/17* (2011.01)
*G02B 6/02* (2006.01)

(52) U.S. Cl.
USPC ................ 359/341.5; 359/341.1; 385/123

(58) Field of Classification Search
USPC ................. 359/341.1, 341.5; 977/778, 834; 385/123
See application file for complete search history.

(56) References Cited

U.S. PATENT DOCUMENTS

| | | | |
|---|---|---|---|
| 4,838,643 A | 6/1989 | Hodges et al. | |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,314,224 B1 | 11/2001 | Stevens et al. | |

(Continued)

FOREIGN PATENT DOCUMENTS

| EP | 1152502 A1 | 11/2001 |
|---|---|---|
| EP | 1347545 A1 | 9/2003 |

(Continued)

OTHER PUBLICATIONS

Tammela et al. "Potential of nanoparticle technologies for next generation erbium-doped fibers", Optical Fiber Communication Conference, 2004.*

(Continued)

*Primary Examiner* — Eric Bolda
(74) *Attorney, Agent, or Firm* — Additon, Higgins, Pendleton & Ashe, P.A.

(57) ABSTRACT

The present invention embraces an amplifying optical fiber having a central core adapted to convey and amplify an optical signal and a cladding that surrounds the central core to confine the optical signal conveyed in the central core. The central core is formed of a core matrix in which nanoparticles are present. The nanoparticles themselves include a nanoparticle matrix and rare-earth-dopant elements. The core matrix may also include one or more additional dopants (i.e., in addition to nanoparticles). The amplifying optical fiber possesses a small numerical aperture and is suitable for use in high-pump-power applications without a degraded gain shape.

25 Claims, 1 Drawing Sheet

(56) References Cited

U.S. PATENT DOCUMENTS

| | | |
|---|---|---|
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,031,590 B2 | 4/2006 | Gasca et al. |
| 7,045,010 B2 | 5/2006 | Sturman, Jr. |
| 7,162,128 B2 | 1/2007 | Lovie et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,702,204 B2 | 4/2010 | Gonnet et al. |
| 7,724,998 B2 | 5/2010 | Parris et al. |
| 7,817,891 B2 | 10/2010 | Lavenne et al. |
| 2002/0003937 A1* | 1/2002 | Aiso .................... 385/123 |
| 2008/0292262 A1 | 11/2008 | Overton et al. |
| 2009/0116798 A1 | 5/2009 | Blanchandin et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1* | 6/2010 | Regnier et al. ............. 359/341.1 |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0254653 A1 | 10/2010 | Molin et al. |
| 2010/0310218 A1 | 12/2010 | Molin et al. |
| 2011/0026889 A1 | 2/2011 | Risch et al. |
| 2011/0044595 A1 | 2/2011 | Sillard et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0116160 A1 | 5/2011 | Boivin et al. |

FOREIGN PATENT DOCUMENTS

| | | |
|---|---|---|
| EP | 1921478 A1 | 5/2008 |
| EP | 2187486 A1 | 5/2010 |
| EP | 2194620 A1 | 6/2010 |
| EP | 2338845 A1 | 6/2011 |
| FR | 2939246 A1 | 6/2010 |
| WO | 2007/020362 A2 | 2/2007 |
| WO | 2009/062131 A1 | 5/2009 |

OTHER PUBLICATIONS

Intention to Grant in counterpart European Patent Application No. 10190541.2 dated Dec. 6, 2012, pp. 1-8.

French Search Report in counterpart French Application No. 09/58010 dated Jun. 16, 2010, pp. 1-6.

Pastouret et al., "Nanoparticle doping process for improved fibre amplifiers and lasers," Proceedings of the International Society for Optical Engineering (SPIE), USA, vol. 7195, Jan. 26, 2009, pp. 1-8.

European Search Report in counterpart European Application No. 10190541 dated May 18, 2011, pp. 1-9.

Patra, "Study of photoluminescence properties of $Er^{3+}$ ions in $SiO_2$-$GeO_2$ and $Al_2O_3$ nanoparticles", Solid State Communications, Pergamon, GB, vol. 132, No. 5, Nov. 1, 2004, pp. 299-303.

Boivin et al., "Quenching investigation on New Erbium Doped Fibers using MCVD Nanoparticle Doping Process", Proceedings of SPIE, SPIE, USA, vol. 7580, Jan. 1, 2010, pp. 1-10.

Wang et al., "Novel erbium doped fiber for high power applications", Passive Components and Fiber-based Devices, Proceedings of the SPIE, vol. 5623, (2005) pp. 411-417.

* cited by examiner

RARE-EARTH-DOPED OPTICAL FIBER HAVING SMALL NUMERICAL APERTURE

CROSS-REFERENCE TO PRIORITY APPLICATION

This application claims the benefit of commonly assigned pending French application Ser. No. 09/58010 for "Fibre en Silice Dopee en Terre Rare a Faible Ouverture Numerique" (filed Nov. 13, 2009, at the National Institute of Industrial Property (France)), which is hereby incorporated by reference in its entirety.

FIELD OF THE INVENTION

The present invention relates to the field of optical fibers and, more specifically, to an amplifying optical fiber for amplifying optical signals that it conveys. Amplifying optical fibers may be used, in particular, as amplifiers in a broad-band transmission line. The invention also provides a method of manufacturing such an amplifying optical fiber.

BACKGROUND

Amplifying optical fibers (e.g., optical fibers doped with rare-earth elements) are commonly used in numerous optical applications.

For example, erbium doping is used in long-distance optical telecommunications systems for amplifying transmitted optical signals. Such optical fibers are used in erbium-doped fiber amplifiers (EDFAs) and have a central core made of a silica matrix that includes rare-earth-dopant elements (e.g., erbium) at concentrations on the order of 250 parts per million (ppm) to 1000 ppm (i.e., 0.025 weight percent to 0.1 weight percent). The rare-earth-dopant elements may be associated with complementary dopant elements to improve amplification. For example, aluminum may be used as a complementary dopant element to broaden the gain band for wavelength division multiplex (WDM) applications.

Conventionally, optical amplification in a rare-earth-doped optical fiber operates by injecting a pump signal into the optical fiber, which excites the rare-earth elements (e.g., $Er^{3+}$ in an EDFA). When a light signal passes through this portion of optical fiber, it de-excites the rare-earth elements by stimulated emission, thereby producing a photon that is identical in all respects to the incident photon. The light signal is thus multiplied by two.

The performance of a rare-earth-doped optical fiber is generally expressed in terms of power conversion efficiency (PCE). As shown in Equation 1 (below), the power conversion efficiency is the ratio of the gain of the amplifying optical fiber to the pump power used in order to obtain the gain. The gain of the amplifying optical fiber is defined by Equation 2.

$$PCE = \frac{P_{out}^S - P_{in}^S}{P_{in}^P} \qquad \text{Equation 1}$$

$$\text{Gain} = P_{out}^S - P_{in}^S \qquad \text{Equation 2}$$

In these equations, $P_{in}^P$ is the input pump power, $P_{in}^S$ is the input signal power, and $P_{out}^S$ is the output amplified signal power.

In certain applications, it is desired to obtain high output powers from the amplifying optical fiber.

One solution involves increasing the concentration of rare-earth dopants in the central core of the optical fiber to increase the amplification gain.

Nevertheless, when the concentration of rare-earth dopants in the central core of the optical fiber is high, pairs or even aggregates of rare-earth elements can form in the core matrix (e.g., of silica) of the central core, thereby leading to non-uniform doping. Such doping non-uniformities reduce the amplification efficiency of the optical fiber because of the simultaneous existence of mechanisms other than the mechanism that provides amplification. These other mechanisms are, for example, resonant energy transfer, stepwise upconversion, cooperative luminescence, cooperative energy transfer, and simultaneous photon absorption. These mechanisms compete with stimulated emission and reduce the efficiency of light amplification. Such aggregates of rare-earth elements also accentuate photonic degradations that can occur in the central core of the optical fiber at high power during propagation of light signals in the optical fiber and as a result of crystal defects present in the core matrix (e.g., of silica) of the central core.

Another solution involves increasing the power of the pump signal. Nevertheless, depending on the value of the numerical aperture of the optical fiber, the energy conversion efficiency may be degraded.

Figure 1:
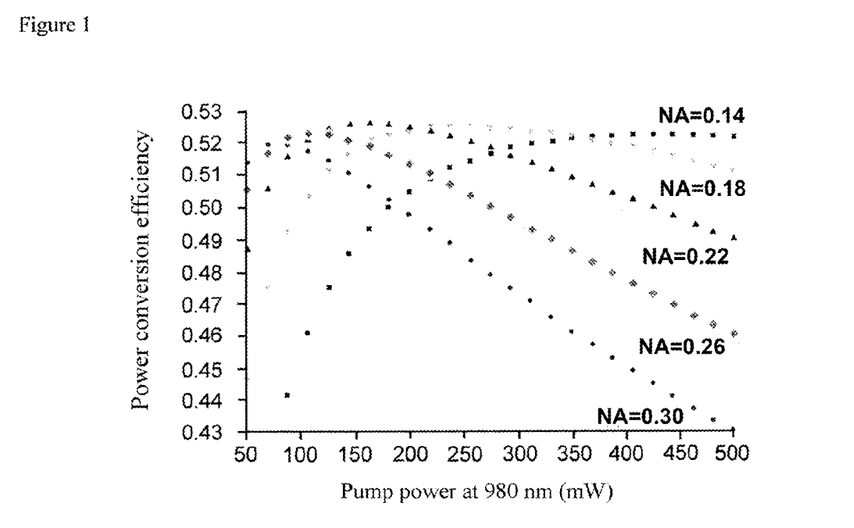
FIG. 1 graphically depicts power conversion efficiency (PCE) as a function of pump power and numerical aperture.

FIG. 1 plots the variation in power conversion efficiency (PCE) as a function of pump signal power. FIG. 1 plots curves acquired for numerical aperture values of between 0.14 and 0.30.

Numerical aperture is an optical-fiber parameter that can be approximated by the following equation:

$$NA = \sqrt{n_c^2 - n_g^2}$$

where $n_c$ is the refractive index of the central core of the optical fiber and $n_g$ is the refractive index of the cladding of the optical fiber.

FIG. 1 illustrates that power conversion efficiency varies as a function of pump power. In particular, for a high numerical aperture value, the power conversion efficiency maximum occurs at low pump power values. For example, with a numerical aperture of 0.30, the power conversion efficiency maximum lies at a pump signal of about 75 milliwatts (mW). In contrast, for a small numerical aperture value, the power conversion efficiency maximum lies at high pump-power values. For example, with a numerical aperture of 0.14, the maximum power conversion efficiency occurs with a pump power of about 500 milliwatts.

In particular, for numerical apertures of less than 0.18, power conversion efficiency at high pump power (e.g., 500 milliwatts) becomes greater than 0.50. Furthermore, the power conversion efficiency varies little over a pump power range of 350 milliwatts to 500 milliwatts, so it is possible to vary the pump power over this range without significantly modifying power conversion efficiency.

Thus, for a given value of numerical aperture, there exists a maximum for power conversion efficiency, and decreasing the numerical aperture shifts the power conversion efficiency maximum towards higher pump-power values.

The explanation of this phenomenon comes from the fact that as the pump power injected into the optical fiber increases, high power densities in the central core give rise to a non-linear effect known as excited state absorption (ESA). When excited state absorption occurs, two pump photons are absorbed by a single rare-earth element, thereby exciting the rare-earth element to higher energy levels (i.e., energy levels that are higher than the typical energy levels appropriate for amplification). By relaxing in a non-radiative manner from these higher energy levels, the rare-earth element does contribute to amplification, but it does so as a result of consuming two pump photons, instead of only one. This loss mechanism reduces yield and, therefore, reduces power conversion efficiency. In other words, in order to obtain a given level of gain, it becomes necessary to use higher pump powers when ESA is present. By decreasing numerical aperture, the mode field diameter (MFD) of the pump signal is increased, thereby reducing the power density of the pump signal in the central core. The reduction of the pump signal's power density reduces the amplitude of excited state absorption, thereby improving power conversion efficiency.

The gain shape of an amplifying optical fiber designates the value of its gain as a function of the wavelength of the incident signal. For example, erbium-doped optical fibers are used to provide amplification in optical transmission systems, particularly for deployment within systems operating within the C band wavelength range. Typically, the C band includes wavelengths between about 1525 nanometers and 1570 nanometers (e.g., between about 1530 nanometers and 1565 nanometers). An erbium-doped optical fiber conventionally exhibits a gain width of about 30 nanometers to 35 nanometers in the C band and a numerical aperture of 0.23.

For high power applications, it is desirable to reduce numerical aperture to avoid losing amplification efficiency, while conserving gain characteristics.

The publication "Novel erbium-doped fiber for high power applications," *Passive Components and Fiber-based Devices*, B. S. Wang et al., Proceedings of the SPIE, Vol. 5623, pp. 411-417 (2005), which is hereby incorporated by reference in its entirety, discloses rare-earth-doped optical fibers at high power for WDM applications. The Wang publication suggests that, for these kinds of fibers, the design of the optical waveguide should be adapted to ensure good overlap between the mode field diameter and the rare-earth elements (i.e., these rare-earth elements experience light, whereas rare-earth elements outside of the mode field will not provide amplification). Additionally, the design of the doping composition (e.g., the dispersion of the rare-earth dopant elements or the chemical environment) should be adapted to determine the gain shape of the EDFA fiber. The erbium-doped optical fiber of the Wang publication is usable at a pump power of 600 milliwatts. Nevertheless, the erbium doping is accompanied by a strong concentration of an aluminum complementary dopant element (i.e., a concentration greater than 12 molar percent) to improve gain width. Unfortunately, aluminum also increases the refractive index difference of the central core with respect to the cladding and increases background losses. It is possible to counter these increases by inserting fluorine to reduce the refractive index difference. However, the extent to which fluorine can be inserted is limited because fluorine can modify the gain width, particularly in the C band. Thus, in order to preserve gain in the C band, the optical fiber described in the Wang publication possesses a numerical aperture of less than 0.176.

European Patent No. 1,152,502 and its counterpart U.S. Patent Publication No. 2002/0003937, each of which is hereby incorporated by reference in its entirety, describe an optical fiber doped with erbium as well as alumina to improve the rare-earth doping. The optical fiber also includes germanium that adapts the value of the refractive index difference between the central core and the cladding to obtain a numerical aperture in the range 0.11 to 0.21. Nevertheless, the intended application is the L band (i.e., 1565 nanometers to 1625 nanometers).

Other solutions involve introducing rare-earth dopants into an optical fiber's central core by incorporating nanoparticles that are doped with rare-earth elements via modified chemical vapor deposition (MCVD). For example, European Patent No. 1,347,545 (and its counterpart U.S. Pat. No. 7,031,590) and International Publication No. WO 2007/020362 (and its counterpart U.S. Patent Publication No. 2009/0116798), each of which is hereby incorporated by reference in its entirety, describe optical fibers that include nanoparticles in the optical fiber's central core. The nanoparticles described in these documents include a rare-earth-dopant element together with at least one element that improves the amplification of the signal, such as aluminum, lanthanum, antimony, bismuth, or some other element. European Patent No. 1,347,545 discloses a final gain shape that is the sum of all the gain shape contributions linked to the plurality of different nanoparticles. The fiber design, nanoparticle manufacturing, and nanoparticle composition are different than in the present invention. International Publication No. WO 2007/020362 fails to disclose any optical fiber particle concentrations and has a different fiber design and nanoparticle composition.

French application Ser. No. 08/06752, which is hereby incorporated by reference in its entirety, describes an optical fiber that is rare-earth-doped by nanoparticles and that enables high powers to be obtained. The characteristics of the nanoparticles and of the doping are selected to ensure high gain in the optical fiber. In particular, the concentration of rare-earth elements is high to improve the gain of the optical fiber. Nevertheless, French application Ser. No. 08/06752 fails to disclose an optical fiber that possesses low numerical aperture for high-power applications.

Therefore, a need exists for a rare-earth-doped amplifying optical fiber with a small numerical aperture for high-pump-power applications without a degraded gain shape.

SUMMARY

Accordingly, in one aspect, the present invention embraces an amplifying optical fiber including a central core adapted to convey and amplify an optical signal and a cladding that surrounds the central core to confine the optical signal conveyed in the central core. The central core is formed of a core matrix in which nanoparticles are present. In other words, nanoparticles are dispersed or embedded within the core matrix. The nanoparticles themselves include a nanoparticle matrix and rare-earth-dopant elements. Typically, the nanoparticle matrix is formed of molecules containing one or more complementary dopant elements. The core matrix may also include one or more additional dopants (i.e., in addition to nanoparticles).

In some exemplary embodiments, the concentration of rare-earth-dopant elements within the optical fiber's central core is between about 200 ppm and 1000 ppm. In the central core, the concentration of the nanoparticle matrix's complementary dopant elements is typically between about 0.5 weight percent and 5 weight percent (e.g., between 1.5 weight percent and 4 weight percent).

In another exemplary embodiment, in the central core, the concentration of the additional dopant is between about 1 weight percent and 10 weight percent.

In yet another exemplary embodiment, the numerical aperture is between about 0.10 and 0.18.

In yet another exemplary embodiment, the additional dopant is germanium, fluorine, aluminum, and/or phosphorous.

In yet another exemplary embodiment, the core matrix is silica.

In yet another exemplary embodiment, the nanoparticles have an atomic ratio of the nanoparticle matrix's complementary dopant elements to the rare-earth-dopant elements of between about 100 and 500 (e.g., between 150 and 350).

In yet another exemplary embodiment, the concentration of nanoparticles in the central core is between about $10^{16}$ and $10^{18}$ nanoparticles per cubic centimeter (NPs/cm³).

In yet another exemplary embodiment, the nanoparticle matrix is alumina ($Al_2O_3$).

In yet another exemplary embodiment, the rare-earth-dopant element is erbium (Er), ytterbium (Yb), and/or thulium (Tm).

In yet another exemplary embodiment, in the optical fiber's central core, the concentration of rare-earth-dopant elements in the central core is between about 200 ppm and 400 ppm, and the concentration of the nanoparticle matrix's complementary dopant elements is between about 2.5 weight percent to 3.5 weight percent.

In yet another exemplary embodiment, the optical fiber exhibits a gain width of between about 30 nanometers and 35 nanometers for the C band (1525 nanometers to 1570 nanometers).

In another aspect, the invention embraces an optical amplifier including at least a portion of amplifying optical fiber that is capable of operating at a pump power of between about 500 milliwatts and 1.5 watts.

In yet another aspect, the invention embraces a method of making a primary preform for an amplifying optical fiber. The method typically includes depositing a silica-based porous layer containing additional dopant on the inside surface of a silica tube. The porous layer generally forms the central core of the optical fiber. The method further includes impregnating the porous layer with a suspension of nanoparticles doped with rare-earth-dopant elements. The concentration of rare-earth-dopant elements in the impregnated porous layer is typically between about 200 ppm and 1000 ppm. The concentration of the nanoparticle matrix's complementary dopant elements in the impregnated porous layer is typically between about 0.5 weight percent and 5 weight percent (e.g., between 1.5 weight percent and 4 weight percent). The concentration of additional dopant in the porous layer is typically between about 1 weight percent and 10 weight percent.

In some exemplary embodiments of the method of the present invention, the additional dopant is germanium, fluorine, aluminum, and/or phosphorous.

In another exemplary embodiment, the method includes heat treating the impregnated porous layer at about 1000° C. or higher for at least one hour.

In yet another exemplary embodiment, the nanoparticle matrix is alumina, the complementary dopant element is aluminum, the rare-earth-dopant element is erbium, and the atomic ratio of aluminum to erbium is between about 100 and 500 (e.g., between 150 and 350).

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a rare-earth-doped amplifying optical fiber with a small numerical aperture for high-pump-power applications without a degraded gain shape.

To this end, the invention proposes incorporating rare-earth-dopant elements into the central core, specifically in the form of nanoparticles. Typically, the central core is formed of a silica-based core matrix that includes nanoparticles and one or more additional dopants (e.g., germanium). The nanoparticles themselves include a nanoparticle matrix and rare-earth-dopant elements. Typically, the nanoparticle matrix is formed of molecules containing one or more complementary dopant elements. The overall chemical composition and structure of the central core make it possible to achieve a numerical aperture between 0.10 and 0.18 without degrading the performance of the amplifying optical fiber.

Typically, the concentration of rare-earth-dopant elements within the optical fiber's central core is between about 200 ppm and 1000 ppm.

The concentration of the nanoparticle matrix's complementary dopant elements within the optical fiber's central core is typically between about 0.5 weight percent and weight percent (e.g., between 1.5 weight percent and 4 weight percent). In other words, the weight fraction of complementary dopant elements in the central core is typically within these specified ranges.

The concentration of the additional dopant (e.g., germanium) within the optical fiber's central core is typically between about 1 weight percent and 10 weight percent.

An optical fiber conventionally includes an optical fiber core (i.e., a central core), which transmits and/or amplifies an optical signal, and an optical cladding, which confines the optical signal within the core. Accordingly, the refractive index of the core $n_c$ is typically greater than the refractive index of the optical cladding $n_g$ (i.e., $n_c > n_g$).

Typically, the central core and some cladding layers are obtained by chemical vapor deposition (e.g., CVD, OVD, VAD, etc.). In a CVD-type manufacturing method, the central core and cladding are deposited on the interior of a substrate tube (i.e., a tube of deposit). In this regard, the substrate tube forms one or more cladding layers. In some embodiments, the substrate tube may be overcladded or sleeved to form additional cladding layers. In general, low-volatility elements (e.g., rare earths, aluminum, etc.) are incorporated by being impregnated into a bar of porous silica during a CVD operation to form the central core of the primary preform.

A rare-earth-doped optical fiber typically has complementary dopant elements (e.g., elemental aluminum in alumina ($Al_2O_3$)) that improve amplification by preventing interactions (i) between the individual rare-earth-dopant elements and (ii) between the rare-earth-dopant elements and crystal defects. Crystal defects are defects in the silica network (e.g., free radicals on silicon or oxygen atoms) that can strongly absorb light and lead to colored centers that increase the optical fiber's attenuation. To prevent these detrimental interactions, the complementary dopant elements need to surround the rare-earth-dopant elements. Typically, when an optical fiber is doped with a solution containing rare-earth ions, the concentration of complementary dopant elements is very high to ensure that each rare-earth-dopant element is surrounded by complementary dopant elements. Unfortunately, these complementary dopant elements modify the central core's refractive index. The high concentration of complementary dopant elements needed to obtain good gain makes it difficult to obtain a small central core refractive index difference in combination with a small numerical aperture.

Accordingly, an exemplary optical fiber includes a central core formed from a silica-based core matrix that incorporates nanoparticles. The nanoparticles are formed of rare-earth-dopant elements and a nanoparticle matrix, which itself is formed of complementary dopant elements that surround the rare-earth elements. By surrounding the rare-earth-dopant elements with the nanoparticle matrix, the environment of the rare-earth-dopant elements is more controlled. In other words, there is a lower probability of clustering or aggregation of the rare-earth dopant elements because they are separated by the surrounding nanoparticle matrix.

Doping by nanoparticles ensures that rare-earth-dopant elements are typically surrounded by the nanoparticle matrix formed of complementary dopant elements. Accordingly, lower concentrations of complementary dopant elements may be used. Therefore, the complementary dopant elements' effect on the central core's refractive index is limited.

In typical embodiments, the optical fiber's central core has a step-index profile. That said, it is within the scope of the present invention for the optical fiber's central core to have other refractive index profiles (e.g., a pedestal profile).

The optical fiber has a concentration of rare-earth-dopant elements and of complementary dopant elements (i.e., within the nanoparticle matrix) that ensures the amplifying property of the optical fiber without disturbing the optical fiber's refractive index profile. Thus, the optical fiber's central core may have a small refractive index difference relative to the cladding, thereby enabling a small numerical aperture to be obtained without degrading the optical fiber's gain width. The optical fiber of the invention can thus possess a numerical aperture that is small (e.g., as low as 0.10). Additional dopant (e.g., one or more different chemical dopants) inserted in the core matrix can then modify the central core's refractive index.

Table 1 (below) provides examples illustrating the relationship between central core refractive index differences $\Delta n_c$ and numerical aperture NA.

TABLE 1

| NA | 0.10 | 0.12 | 0.13 | 0.14 | 0.15 | 0.16 | 0.17 | 0.18 |
|---|---|---|---|---|---|---|---|---|
| $\Delta n_c$ ($\times 10^{-3}$) | 3.5 | 5 | 5.8 | 6.7 | 7 | 8.8 | 9.9 | 11.1 |

Typically, the optical fiber possesses a central core refractive index difference $\Delta n_c$ of between about $3.5 \times 10^{-3}$ and $11.1 \times 10^{-3}$, thereby making it possible to achieve a numerical aperture of between about 0.10 and 0.18.

The core matrix is typically silica-based, and in some exemplary embodiments, is pure silica.

The nanoparticle matrix has a composition and structure that enhance the solubilization of rare-earth-dopant elements. This nanoparticle matrix is different from the core matrix of the optical fiber.

The nanoparticle matrix may be an oxide that enables a high concentration of rare-earth-dopant elements to be dissolved. The nanoparticle matrix provides the gain properties of the optical fiber and maintains a physical barrier between the rare-earth-dopant elements and crystal defects in the core matrix. Furthermore, the nanoparticle matrix is capable of withstanding fiber fabrication conditions (e.g., high temperature and pressure) to ensure that the nanoparticles do not melt into the core matrix during fiber fabrication.

The nanoparticle matrix may be made of alumina ($Al_2O_3$). Alumina allows rare-earth-dopant elements to be well distributed within the nanoparticle. Moreover, alumina enables the amplification gain to be enlarged in the spectrum window for WDM applications. Alumina gives rise to an increase in the refractive index difference of the central core, at a rate of $3 \times 10^{-3}$ per percentage by weight. The increase in refractive index, however, is kept to a minimum because only a low concentration of alumina is required due to the doping of the optical fiber by nanoparticles.

The nanoparticle matrix may also contain phosphorous in addition to alumina (e.g., when using Er/Yb co-doping) to enhance the absorption efficiency of erbium by transferring energy from ytterbium to erbium.

The nanoparticles of the present invention can include different kinds of rare-earth-dopant elements. Typically, each rare-earth-dopant element consists of a single chemical element, such as erbium, ytterbium, thulium, or any other rare-earth element enabling amplification by optical pumping in a given spectrum window. In particular, the rare-earth-dopant elements may be erbium for amplification in the C band.

In the central core of the optical fiber, the concentration of rare-earth-dopant elements is between about 200 ppm and 1000 ppm. In other words, there is between 200 ppm and 1000 ppm of rare-earth-dopant elements present in the totality of the central core.

Typically, in the optical fiber's central core, the concentration of the nanoparticle matrix's complementary dopant elements is between about 0.5 weight percent and 5 weight percent (e.g., between 1.5 weight percent and 4 weight percent). More typically, the central core's complementary dopant element concentration is between about 1.5 weight percent and 4 weight percent.

In exemplary embodiments, the concentration of rare-earth-dopant elements in the optical fiber's central core is between about 200 ppm and 400 ppm, and the concentration of the complementary dopant elements may be between about 2.5 weight percent and 3.5 weight percent. More typically, the concentration of rare-earth-dopant elements in the optical fiber's central core is between about 250 ppm and 350 ppm, and the concentration of the complementary dopant elements is between about 2.8 weight percent and 3.2 weight percent.

The nanoparticles may possess an atomic ratio of complementary dopant elements to rare-earth-dopant elements (e.g., a molar ratio of aluminum atoms to erbium atoms) of more than about 5 (e.g., more than about 10), such as between about 100 and 500 (e.g., between 150 and 350). If the atomic ratio is higher, the effect of the rare-earth-dopant elements will be less pronounced. If the atomic ratio is too low, the efficiency of the gain will decrease.

The optical fiber's central core may have a nanoparticle concentration of between about $10^{16}$ NPs/cm$^3$ and $10^{18}$ NPs/cm$^3$ (e.g., between $5 \times 10^{16}$ NPs/cm$^3$ and $5 \times 10^{17}$ NPs/cm$^3$).

The concentrations for both the rare-earth-dopant elements and complementary dopant elements enable a small numerical aperture to be obtained without degrading the gain shape, which is important for use in high-power applications. In particular embodiments, the central core's concentrations of erbium (i.e., as the rare-earth-dopant element) and complementary dopant elements make it possible to obtain a gain width of 30 nanometers to 35 nanometers in the C band, with a limited increase in the refractive index difference of the central core. Thus, a small numerical aperture may be achieved.

The core matrix includes additional dopant that affects the refractive index difference between the central core and the cladding. Typically, the concentration of additional dopant in the central core is between about 1 weight percent and 10 weight percent. Thus, the numerical aperture is adjustable over the range of 0.10 to 0.18 by using additional dopants in the core matrix. Varying the concentration of additional dopants within the central core facilitates the achievement of a numerical aperture between 0.10 and 0.18. The composition of the core matrix thus makes it possible to obtain the desired numerical aperture. The additional dopant may be fluorine, germanium, phosphorous, and/or aluminum, as well as any other element providing the refractive index difference needed for guiding the optical signal in the central core. For example, the core matrix may include germanium at a concentration of between about 1 weight percent and 10 weight percent.

The concentrations of the rare-earth-dopant element, nanoparticle matrix, complementary dopant element, and additional dopant of the optical fiber of the invention achieve the desired numerical aperture without degrading the gain shape of the amplification. The optical fiber typically possesses a central core refractive index difference (i.e., relative to the cladding) that is small enough to achieve a small numerical aperture while exhibiting a gain width that is not degraded. Thus, the rare-earth-doped optical fiber of the invention may possess a numerical aperture over a broad range of values that were not previously possible (e.g., as low as 0.10). In a particular embodiment, an erbium-doped optical fiber possesses a gain width of between about 30 nanometers and 35 nanometers for the C band (1525 nanometers to 1570 nanometers), as well as a numerical aperture of between about 0.10 and 0.18.

Thus, the optical fiber of the invention may achieve a maximum power conversion efficiency (PCE) for large pump powers (e.g., greater than 500 milliwatts).

The desired optical fiber numerical aperture may be determined by the intended use of the optical fiber. For example, when the optical fiber is positioned with a small radius of curvature, the numerical aperture may be greater than a value below which bending losses would reduce the efficiency of the amplification. Typically, this numerical aperture value is about 0.12, which also corresponds to the numerical aperture of a standard single-mode fiber (SMF).

An exemplary optical fiber may include a central core having an erbium concentration of 250 ppm, a concentration of aluminum of 3 weight percent, and a concentration of germanium equal to 1 weight percent, thereby making it possible to obtain the characteristics set out in Table 2. In the exemplary optical fiber, aluminum and erbium are in the form of nanoparticles having an Al/Er atomic ratio of 200.

TABLE 2

| $\Delta n$ ($\times 10^{-3}$) | central core diameter ($\mu m$) | $\lambda_c$ ($\mu m$) | MFD ($\mu m$) | NA |
|---|---|---|---|---|
| 9.9 | 4.9 | 1066 | 7.4 | 0.17 |

The central core's refractive index difference relative to the cladding is $9.9 \times 10^{-3}$, thereby making it possible to achieve a numerical aperture of 0.17 (see Table 1). The optical fiber also possesses a central core diameter of 4.9 microns, a cutoff wavelength of 1066 nanometers, and a mode field diameter of 7.4 microns at a wavelength of 1550 nanometers.

Figure 2:
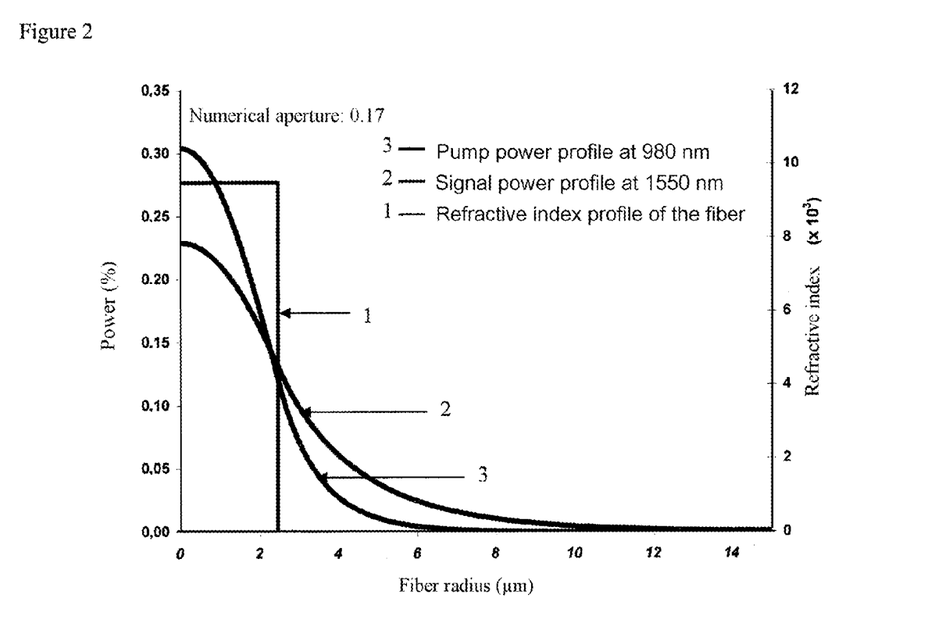
FIG. 2 schematically depicts (i) the refractive index profile of an exemplary optical fiber; (ii) the distributions of pump power within the exemplary optical fiber; and (iii) the distributions of the signal power transmitted by the exemplary optical fiber of the invention.

FIG. 2 schematically depicts (i) the refractive index profile of the exemplary optical fiber; (ii) the distributions of pump power within the exemplary optical fiber; and (iii) the distributions of the signal power transmitted by the exemplary optical fiber of the invention.

The abscissa axis represents the radius of the optical fiber. The right-hand ordinate axis gives refractive index difference relative to the cladding. The left-hand ordinate axis gives power in the optical fiber.

Curve 1 represents the refractive index profile of the optical fiber, which is a step index profile. The central core's refractive index difference is a constant value of $9.9 \times 10^{-3}$ over the entire width of the central core.

Curves 2 and 3 respectively show the power distributions of the signal and of the pump. The pump possesses a wavelength of 980 nanometers, and the signal possesses a wavelength of 1550 nanometers. Compared with a conventional optical fiber, the signal is less concentrated in the central core, thereby giving rise to an increase in the mode field diameter MFD. Thus, the phenomenon of ESA is avoided, and the optical fiber may be used with a pump power of 1.5 Watts. The desired power conversion efficiency and gain are achieved, while exhibiting a gain width of 30 nanometers to 35 nanometers in the C band.

The invention also provides an optical amplifier having at least a portion of the optical fiber and using a pump power of between about 500 milliwatts to 1.5 Watts.

The invention also provides a method of fabricating a primary preform for the rare-earth-doped optical fiber as described above.

The method includes a step of depositing a silica-based porous layer containing additional dopant on the inside surface of a silica tube. The porous layer forms the central core of the resulting optical fiber. The concentration of additional dopant in the porous layer is between about 1 weight percent and 10 weight percent. The porous layer is then impregnated with a suspension of rare-earth-doped nanoparticles formed of rare-earth-dopant elements within a nanoparticle matrix containing complementary dopant elements. The concentration of the rare-earth-dopant element in the porous layer is between about 200 ppm and 1000 ppm, and the concentration of the complementary dopant elements in the porous layer is between about 0.5 weight percent and 5 weight percent (e.g., between 1.5 weight percent and 4 weight percent).

By impregnating the porous layer with a suspension of nanoparticles and depositing a porous layer containing additional dopant, the optical fiber obtained from the primary preform (i) possesses a numerical aperture that is small and (ii) has a non-degraded gain shape. More particularly, the method makes it possible to obtain an optical fiber having a numerical aperture of between about 0.10 and 0.18. For example, the optical fiber doped with a rare-earth-dopant element, such as erbium, may be used at high pump power, while conserving a gain width of about 30 nanometers to 35 nanometers in the C band.

The nanoparticles may be produced by physical or chemical synthesis. Chemical synthesis is preferred because it enhances the formation of thermodynamically stable stoichiometric structures. A so-called "sol-gel" method may be used for chemically synthesizing nanoparticles in an aqueous solution at controlled pH by co-precipitation of precursors of aluminum salts (when the nanoparticle matrix is made of alumina) and of rare-earth salts. For example, it is possible to use inorganic salts (such as the nitrate or the chloride) as alumina precursors and organic salts (such as acetyl acetonate or acetate) as precursors of erbium, ytterbium, or thulium.

The ratio of aluminum salt precursors to rare-earth salt precursors may be between about 100 and 500 (e.g., between about 150 and 350) to obtain a concentration by weight of rare-earth-dopant elements in each nanoparticle that is between about 0.5 weight percent and 3 weight percent (e.g., between about 0.75 weight percent and 1.5 weight percent)

depending on the intended applications and the rare-earth-dopant elements selected. For example, the nanoparticle matrix may be made of alumina, the rare-earth-dopant element may be erbium, and the atomic ratio of the elemental aluminum to the erbium may be between about 100 and 500 (e.g., between about 150 and 350).

Thereafter, the nanoparticles are washed and dispersed in an aqueous or alcohol solution with a nanoparticle concentration of between about $10^{16}$ NPs/cm$^3$ and $10^{18}$ NPs/cm$^3$, depending on the size of the nanoparticles. For example, the nanoparticles may be dispersed in the aqueous or alcohol solution with a nanoparticle concentration that is greater than or equal to $10^{17}$ NPs/cm$^3$ for nanoparticles having an average diameter of 5 nanometers (i.e., 5 nanometers±10 percent), and greater than or equal to $10^{16}$ NPs/cm$^3$ for nanoparticles having an average diameter of 10 nanometers (i.e., 10 nanometers±10 percent). Those having ordinary skill in the art will recognize that the average size of nanoparticles can be determined via X-Ray diffraction. Alternatively, the particle size distribution within a nanoparticle suspension may be determined via light diffraction or light diffusion.

To ensure that the nanoparticle matrix is conserved in the final optical fiber and is capable of constituting a physical barrier between the rare-earth-dopant elements and crystal defects of the core matrix of the optical fiber, it is important that the nanoparticle matrix can withstand fiber fabrication conditions (e.g., temperature and stress). Thus, for certain nanoparticle matrices, it is possible to provide a step of thermally densifying the nanoparticles after they have been incorporated in the porous layer of the primary preform by impregnation, and prior to vitrification of the layer that has been doped in this way. The tube may thus be subjected to heat treatment at a temperature of about 1000° C. or higher for at least 1 hour to reinforce the structure of the nanoparticles in the central core.

This is followed by a vitrification operation and a collapsing operation to obtain the primary preform. Finally an overcladding operation forms a final preform that is suitable for use on a fiber-drawing tower (i.e., to draw the optical fiber).

The additional dopant may be germanium, fluorine, phosphorous, and/or aluminum.

The fabrication method can be better understood from a description of the fabrication of the above-described exemplary optical fiber. The optical fiber may be fabricated using MCVD technology.

Silica-based cladding is formed on the inside surface of a silica tube by depositing successive layers that are sintered at 2000° C.

A porous layer forming a germanium-silica central core is then formed at low temperature to avoid vitrifying the layer. Germanium is inserted in the silica matrix by the reaction between volatile precursors, such as tetrachlorosilane $SiCl_4$ and germanium tetrachloride $GeCl_4$. The mixture of precursors is adjusted so that the germanium content in the core matrix is approximately equal to 1 weight percent.

The porous layer is impregnated at ambient temperature with a solution containing nanoparticles in suspension having a nanoparticle matrix of alumina ($Al_2O_3$) and doped with erbium (Er) (i.e., as the rare-earth-dopant element).

The Al/Er ratio in the nanoparticles is adjusted to 200. After impregnation, the porous layer has an aluminum percentage of 3 weight percent.

The porous layer is then sintered at 2000° C., and the MCVD tube is collapsed to achieve a primary preform.

The primary preform is subsequently sleeved with silica tubes to adjust the diameter of the central core to the desired value and also to adjust the core/cladding ratio.

The preform obtained in this way is subsequently drawn to form an optical fiber having an erbium concentration of 250 ppm and having the characteristics as described above with reference to Table 2.

The exemplary optical fiber of the invention described above is not limiting to potential applications of the invention. In particular, an optical amplifier may be made using nanoparticles that include a nanoparticle matrix other than alumina and that are doped with rare-earth-dopant elements other than erbium. The gain of the amplifier depends on the concentration and on the kind of rare-earth element used.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for a Optical Fiber Amplifier Having Nanostructures, filed Feb. 19, 2010, (Burow et al.); U.S. Patent Application Publication No. US2010/0254653 A1 for a Multimode Fiber, filed Apr. 22, 2010, (Molin et al.); U.S. patent application Ser. No. 12/794,229 for a Large Bandwidth Multimode Optical Fiber Having a Reduced Cladding Effect, filed Jun. 4, 2010, (Molin et al.); U.S. patent application Ser. No. 12/878,449 for a Multimode Optical Fiber Having Improved Bending Losses, filed Sep. 9, 2010, (Molin et al.); U.S. patent application Ser. No. 12/884,834 for a Multimode Optical Fiber, filed Sep. 17, 2010, (Molin et al.); and U.S. patent application Ser. No. 12/887,813 for a Optical Fiber for Sum-Frequency Generation, filed Sep. 22, 2010, (Richard et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,526,177 for a Fluorine-Doped Optical Fiber (Matthijsse et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Patent Application Publication No. US2010/0067857 A1 for a High-Fiber-Density Optical Fiber Cable, filed Sep. 10, 2009, (Louie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. patent application Ser. No. 12/843,116 for a Tight-Buffered Optical Fiber Unit Having Improved Accessibility, filed Jul. 26, 2010, (Risch et al.); U.S. patent application Ser. No. 12/881,598 for Methods and Devices for Cable Insertion into Latched Conduit, filed Sep. 14, 2010, (Leatherman et al.); U.S. patent application Ser. No. 12/907,241 for a High-Fiber-Density Optical-Fiber Cable, filed Oct. 19, 2010, (Overton et al.); and U.S. patent application Ser. No. 12/907,265 for an Optical-Fiber Cable Having High Fiber Count and High Fiber Density, filed Oct. 19, 2010, (Tatat et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An amplifying optical fiber, comprising:
a central core comprising a core matrix, said central core adapted to transmit and amplify optical signals; and
a cladding surrounding said central core and adapted to confine optical signals within said central core;
wherein said core matrix comprises (i) additional dopant and (ii) nanoparticles formed of rare-earth-dopant elements and a nanoparticle matrix, said nanoparticle matrix comprising one or more complementary dopant elements;
wherein, within said central core, the concentration of said additional dopant is between about 1 weight percent and 10 weight percent;
wherein, within said central core, the concentration of said rare-earth-dopant elements is between about 200 ppm and 1000 ppm;
wherein, within said central core, the concentration of said complementary dopant elements is between about 0.5 weight percent and 5 weight percent; and
wherein the optical fiber's numerical aperture is between 0.10 and 0.18.

2. The optical fiber according to claim 1, wherein said additional dopant comprises germanium, fluorine, aluminum, and/or phosphorous.

3. The optical fiber according to claim 1, wherein:
each rare-earth-dopant element consists essentially of a single chemical element; and
at least one of said nanoparticles is formed of at least two different kinds of rare-earth-dopant elements.

4. The optical fiber according to claim 1, wherein, within said central core, the concentration of said nanoparticles is between about $10^{16}$ NPs/cm$^3$ and $10^{18}$ NPs/cm$^3$.

5. The optical fiber according to claim 1, wherein said rare-earth-dopant elements comprise erbium, thulium, and/or ytterbium.

6. The optical fiber according to claim 1, wherein the concentration of said rare-earth-dopant elements in said nanoparticles is between about 0.5 weight percent and 3 weight percent.

7. The optical fiber according to claim 1, wherein the concentration of said rare-earth-dopant elements in said nanoparticles is between about 0.75 weight percent and 1.5 weight percent.

8. The optical fiber according to claim 1, wherein said nanoparticle matrix consists essentially of alumina ($Al_2O_3$).

9. The optical fiber according to claim 1, wherein, within said central core, the concentration of said complementary dopant elements is between about 1.5 weight percent and 4 weight percent.

10. The optical fiber according to claim 1, wherein the atomic ratio of said complementary dopant elements to said rare-earth-dopant elements is between about 100 and 500.

11. The optical fiber according to claim 1, wherein the atomic ratio of said complementary dopant elements to said rare-earth-dopant elements is between 150 and 350.

12. The optical fiber according to claim 1, wherein:
within said central core, the concentration of said rare-earth-dopant elements is between 200 ppm and 400 ppm; and
within said central core, the concentration of said complementary dopant elements is between 2.5 weight percent and 3.5 weight percent.

13. The optical fiber according to claim 1, wherein, for a wavelength of between 1525 nanometers and 1570 nanometers, the optical fiber's gain width is between about 30 nanometers and 35 nanometers.

14. An optical amplifier comprising at least a portion of the optical fiber according to claim 1.

15. An amplifying optical fiber, comprising:
a central core comprising a silica-based core matrix, said central core adapted to transmit and amplify optical signals; and
a cladding surrounding said central core and adapted to confine optical signals within said central core;
wherein said core matrix comprises additional dopant comprising germanium, fluorine, aluminum, and/or phosphorous;
wherein said core matrix comprises nanoparticles that are formed of (i) rare-earth-dopant elements comprising erbium, thulium, and/or ytterbium, and (ii) a nanoparticle matrix comprising one or more complementary dopant elements;
wherein, within said central core, the concentration of said additional dopant is between about 1 weight percent and 10 weight percent;
wherein, within said central core, the concentration of said rare-earth-dopant elements is between about 200 ppm and 1000 ppm;
wherein, within said central core, the concentration of said complementary dopant elements is between about 0.5 weight percent and 5 weight percent; and
wherein the optical fiber's numerical aperture is between 0.10 and 0.18.

16. The optical fiber according to claim 15, wherein the concentration of said rare-earth-dopant elements in said nanoparticles is between about 0.5 weight percent and 3 weight percent.

17. The optical fiber according to claim 15, wherein, within said central core, the concentration of said nanoparticles is between about $10^{16}$ NPs/cm$^3$ and $10^{18}$ NPs/cm$^3$.

18. The optical fiber according to claim 15, wherein the atomic ratio of said complementary dopant elements to said rare-earth-dopant elements is between about 5 and 500.

19. The optical fiber according to claim 15, wherein said nanoparticle matrix consists essentially of alumina ($Al_2O_3$), whereby the complementary dopant is aluminum.

20. The optical fiber according to claim 15, wherein:
said rare-earth-dopant elements consist essentially of erbium;
said nanoparticle matrix consists essentially of alumina ($Al_2O_3$), whereby the complementary dopant is aluminum; and
within the nanoparticles, the atomic ratio of aluminum to erbium is between 150 and 350.

21. The optical fiber according to claim 15, wherein, for a wavelength of between 1525 nanometers and 1570 nanometers, the optical fiber's gain width is between 30 nanometers and 35 nanometers.

22. The optical fiber according to claim 15, wherein, at pump wavelength of 980 nanometers and a pump power between 500 milliwatts and 1500 milliwatts, the optical fiber achieves a power conversion efficiency of at least 0.50.

23. The optical fiber according to claim 15, wherein:
within said central core, the concentration of said rare-earth-dopant elements is between 250 ppm and 350 ppm; and
within said central core, the concentration of said complementary dopant elements is between 2.8 weight percent and 3.2 weight percent.

24. The optical fiber according to claim 1, wherein said rare-earth-dopant elements consist essentially of erbium.

25. The optical fiber according to claim 1, wherein, at pump wavelength of 980 nanometers and a pump power between 500 milliwatts and 1500 milliwatts, the optical fiber achieves a power conversion efficiency of at least 0.50.

* * * * *